3,238,961
FLUID SWITCH

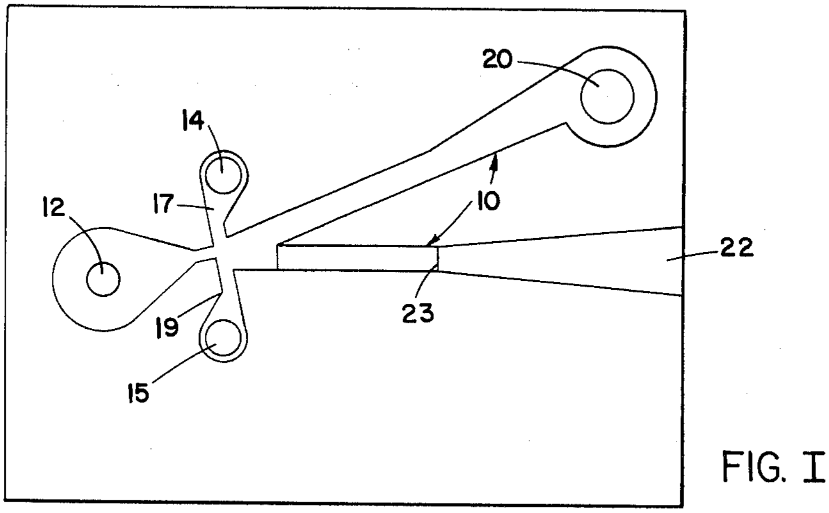
FIG. I
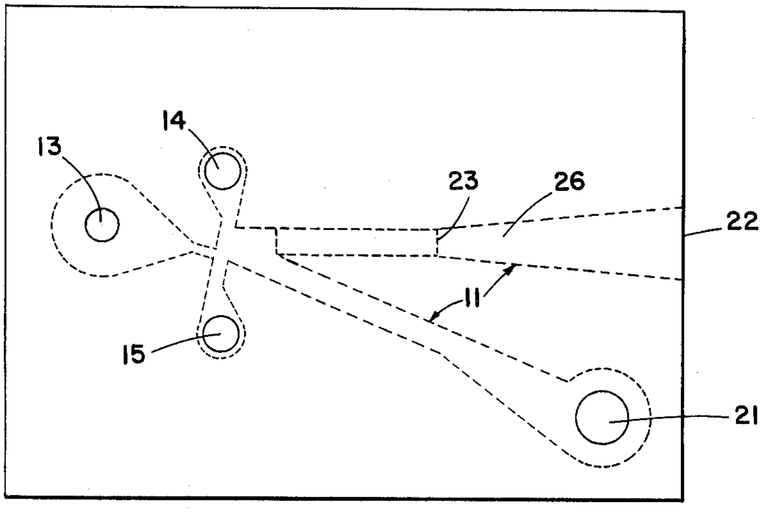
FIG. II
INVENTOR.
RICHARD W. HATCH, JR.
BY
Lawrence H. Patton
AGENT FIG. III
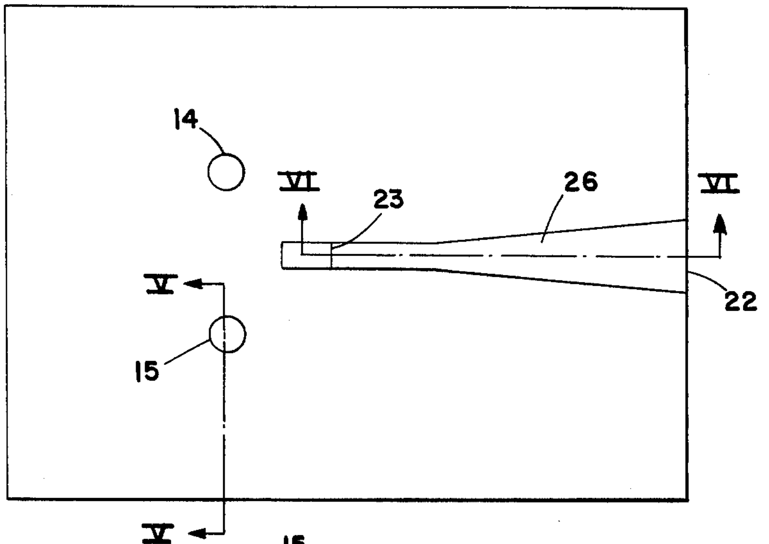
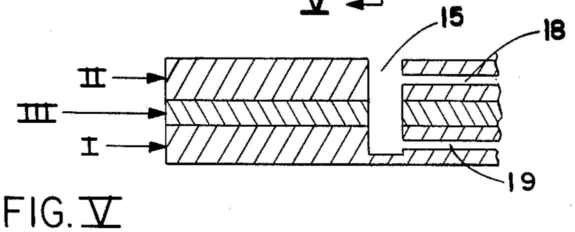
FIG. V
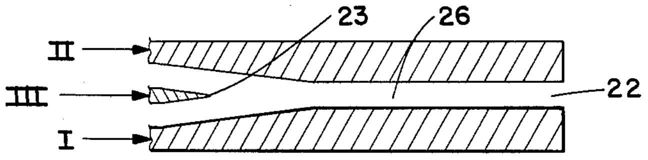
FIG. VI
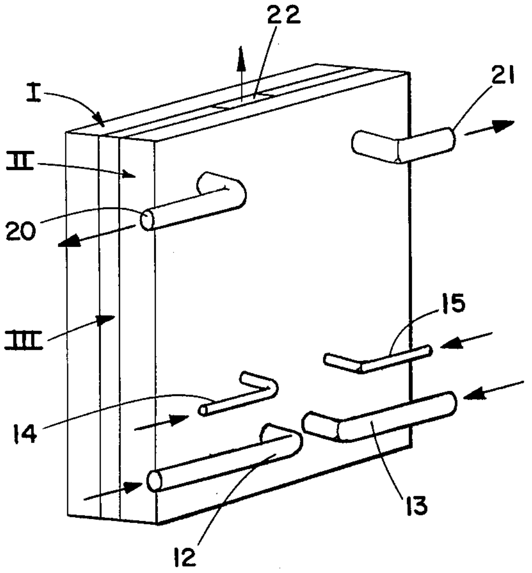
FIG. IV
INVENTOR.
RICHARD W. HATCH, JR.
BY
Laurence H. Patton
AGENT March 8, 1966 R. W. HATCH, JR 3,238,961
FLUID SWITCH
Filed Oct. 10, 1963 4 Sheets-Sheet 3
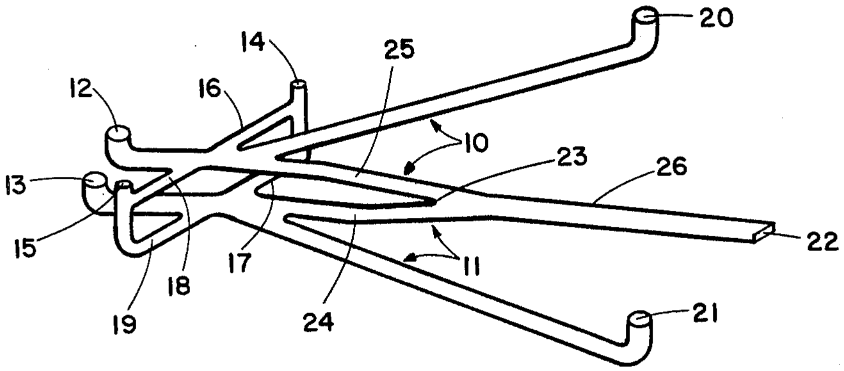
FIG. VII
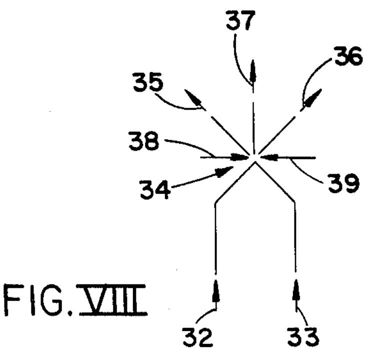
FIG. VIII
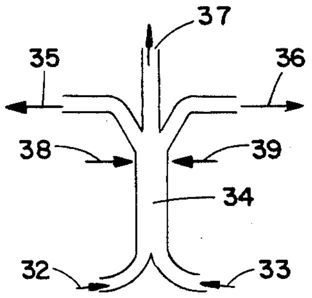
FIG. IX
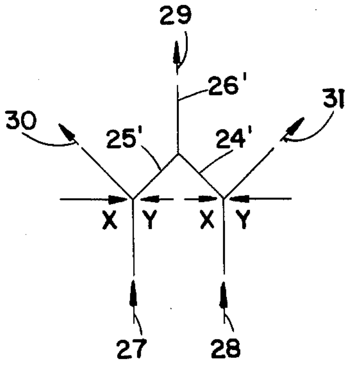
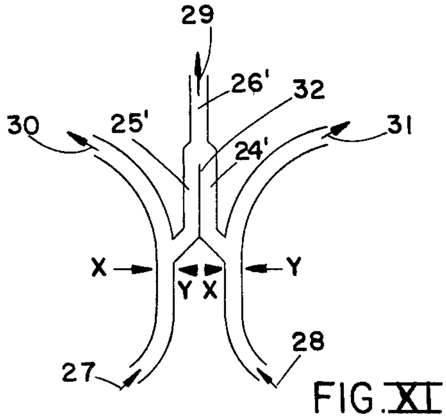
FIG. XI
FIG. X
INVENTOR.
RICHARD W. HATCH JR.
BY
Lawrence H. Paxton
AGENT March 8, 1966 R. W. HATCH, JR 3,238,961
FLUID SWITCH
Filed Oct. 10, 1963 4 Sheets-Sheet 4
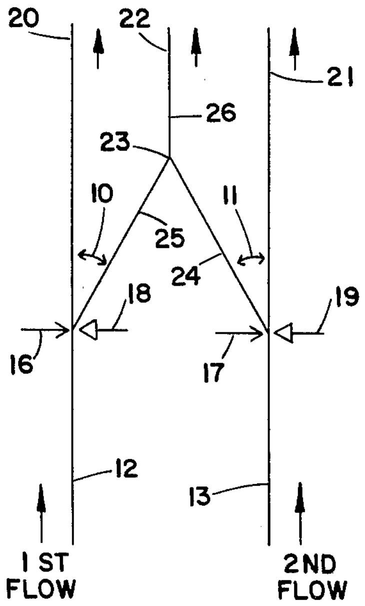
FIG. XII
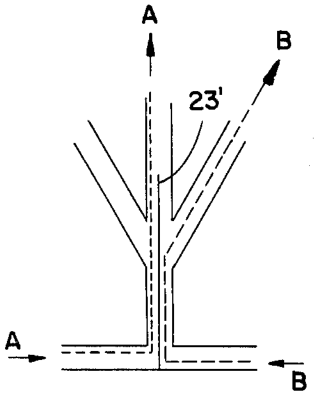
FIG. XIII
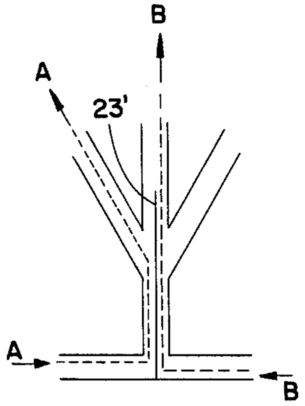
FIG. XIV
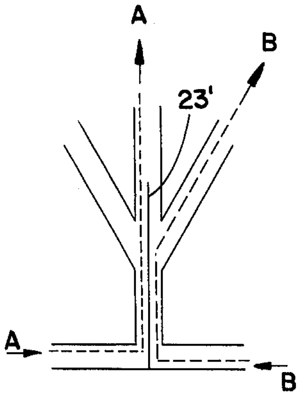
FIG. XV
INVENTOR.
RICHARD W. HATCH JR.
BY
Lawrence H. Poston
AGENT

Richard W. Hatch, Jr., Norwell, Mass., assignor to The Foxboro Company, Foxboro, Mass., a corporation of Massachusetts Filed Oct. 10, 1963, Ser. No. 315,163
2 Claims. (Cl. 137—81.5)

This invention relates to fluid devices as fluid logic means and particularly provides a multiple unit combination of such devices as fluid switch means.

This is a fluid logic unit with two main flow inputs and three outputs, one of the outputs being a common.

As an example of application of this invention, it may be used as a chromatographic sampling unit wherein a carrier gas and a sample gas displace each other by shearing in turn as a means of entering a finite sample into a carrier stream.

It is an object of this invention to provide a new and novel fluid switch.

Other objects and advantages of this invention will be in part apparent and in part pointed out hereinafter, and in the accompanying drawings, in which:

FIGURE I is a showing of the back plate of a sandwich unit embodying this invention;

FIGURE II is a view of the top plate of the sandwich unit involved in FIGURE I;

FIGURE III is a view of the intermediate plate of the sandwich unit involving FIGURES I and II;

FIGURE IV is a showing of the assembled sandwich involving the plates of FIGURES I, II and III;

FIGURE V is a section taken as indicated on V—V of FIGURE III on the basis of the whole unit being assembled as in FIGURE IV;

FIGURE VI is a section taken as on line VI—VI of FIGURE III on the basis of the whole unit being together as in FIGURE IV;

FIGURE VII is a schematic pipe arrangement showing the passage structure of the device within the block of FIGURE IV;

FIGURES VIII and IX are schematic showings of flow and control paths of a modified form of this system according to this invention;

FIGURES X and XI are similar schematic showings of the flow and control system of the structure of the FIGURES I through VII;

FIGURE XII is another form of schematic, illustrating the flow paths of the structure of FIGURE VII;

FIGURES XIII, XIV and XV illustrate three steps of operation of this device wherein FIGURE XIII shows the flow pattern in one position, FIGURE XIV shows the flow pattern in a second position after a control pressure has been applied from the right in FIGURE XIII, and FIGURE XV shows the flow pattern back again in the position in FIGURE XIII after a control pressure has been applied at the left in FIGURE XIV.

As possibly the most direct approach to understanding this device, reference is made first to FIGURE VII wherein there is provided a first logic unit 10 mounted in association with a second logic unit 11. There are two main input flows, one at 12 and one at 13. There are two control pressure inputs, one at 14 and one at 15. Note that either the control input 14 or 15 simultaneously serve both of the logic units 10 and 11 by way of, for the control input 14, pipes 16 and 17, and for the control input 15 by way of pipes 18 and 19.

There are three outputs in the FIGURE VII structure, one at 20 which is individual to input flow 12 and logic unit 10. Only the flow from input 12 can exit through the output 20. Another output 21 is individual to the flow from the input 13 and to the logic unit 11.

That is, only the flow which is in at input 13 can exit at 21.

Finally, there is a central common output 22 which may be the output for either the input 12 or the input 13 depending on their switching situations, but never together, always either one or the other and this is accomplished by the juncture 23 of the inner legs of the logic unit 10 and the logic unit 11. By reference to FIGURES XIII, XIV and XV, this arrangement of flows and the variants thereof may be better understood, especially on the basis of the location of the merging point 23 in FIGURE VII. That is to say, each of the logic units 10 and 11, has individual inner leg portions 24 and 25, which merge at the merge point 23 to form the common output pipe 26, with the output 22. In point of fact, as will be seen in the actual structure of the inner legs 24 and 25, 25 is above, and 24 is below and they taper down and up respectively to the merge point 23 and this is particularly illustrated in FIGURE VI.

Returning now to FIGURE I, this is the back plate of the sandwich with the fluid passages shown as open channels because they are to be part of the sandwich, and the several reference numerals of FIGURE VII are correspondingly illustrated here.

FIGURE II is the front plate drawing with the channels underneath and therefore dotted and again, like numerals indicate like portions with respect to FIGURE VII.

Again, with respect to FIGURE III, the various reference numbers are taken from FIGURE VII.

The FIGURE V showing is a fragment of the sandwich as on line V—V in FIGURE III, but with the structure soon to be assembled as in FIGURE IV and again, the various reference numbers apply as from FIGURES I, II, and III and VII. The back plate of FIGURE V is indicated as I for FIGURE I. The top plate is indicated as II; the central plate is indicated as III for FIGURE III.

Similarly in FIGURE VI, the section is taken on VI—VI of FIGURE III as if the entire assembly were together and again the bottom plate is indicated as I as a portion and again the bottom plate is indicated as I as a II as a portion from FIGURE II, and the central fragment is indicated as III as taken from the structure FIGURE III. Otherwise, the numerals are the same as in FIGURE VII for like references for like members and points.

The FIGURE IV showing is the combined sandwich unit made up of the structures of FIGURES I, II and III and like reference numerals are applied to like elements therein with respect to the showing in FIGURE VII. FIGURES I, II and III represent the different plates and they are indicated in FIGURE IV by numerals I, II and III.

By way of further illustration, the flow pattern of this device, FIGURE XII, is a line drawing representative of the FIGURE IV structure and following the numeral reference of FIGURE VII. In this structure, it may be noted that there are two logic units 10 and 11 which are individual unto themselves until their inner legs 24 and 25 meet at the merging point 23 and from there on there is a common output. This is represented in FIGURES XIII, XIV and XV by a central barrier 23'. In FIGURE XIII, one of the main flows indicated at A exits through the common leg of the device, and the other main flow B exits from the right leg of the right hand logic section. From this flow pattern, a control signal may be applied from the right as in the drawing with the result that the flow pattern of FIGURE XIV will be achieved wherein the main inflow B is now the flow to emerge from the central common output and the flow A is now emerging from the left hand output of the left hand logic unit of the device. In completion of this cycle of steps, the flow pattern of FIGURE IV has then applied thereto a control force from the left as in the drawing so that the two flows are now flipped to the right and appear as in FIGURE XV in duplication of the previous pattern of FIGURE XIII. Thus, the two main flows A and B may be flipped back and forth selectively, placing one or the other in the common output and the control signal flips both of these flows preferably simultaneously with a single signal.

Two forms of this device are shown herein. One involves all of the figures except FIGURES VIII and IX. This one is the situation where the two logic units are joined together and they each start out by having two outputs and one of the legs of each joins up to form the single common output, this resulting in the divider situation as illustrated by 23' in FIGURES XIII, XIV and XV so that the central common output starts at the merge point 23 as shown in the various figures.

This pattern is illustrated in a different way in FIGURES X and XI with a line pattern in FIGURE X and a flow pipe pattern in XI. In FIGURES X and XI, the two main input flows are 27 and 28. The two logic units are provided with a common output 29, an output 30 individual to the input 27, an output 31 individual to the input 28, and inner legs 24' and 25' leading to a merge point and a common output 26'. The control forces are indicated as a simultaneous signal on both logic units from the left as at X or a simultaneous signal on both logic units from the right as at Y. In the FIGURE XI showing, the representation of the divider between the logic units leading to the common output is indicated at 32.

Another form of the logic unit arrangement and flow pattern is indicated in FIGURES VIII and IX. FIGURE VIII is a line drawing and for further understanding, FIGURE IX is a flow pipe diagram of the same situation. In this structure, the control action all takes place in one control area indicated at 34. This differs from the structure in FIGURES X and XI in that in FIGURES X and XI there are two separate control areas individual to themselves prior to the later merging of one leg of each to a central output.

Thus, in FIGURES VIII and IX, there are two main input flows 32 and 33 leading to the control area 34 from which there are three outputs: output 35, individual to input 32; output 36, individual to input 33; and output 37 which is common to both. Control signals are indicated by arrows 38 and 39 on the basis that the application of the arrow 38 of the control would cause the flow 32 to exit through the common output 37 and flow from the input 33 to exit through the output 36. From this situation, application of the control signal 39 would flip both over and cause input flow 33 to exit from the common 37 and input 32 to exit from the individual 35.

This situation is further illustrated in FIGURE IX and it is identifiable by the fact that the FIGURE XI separator plate 32 is not in the structure of FIGURES VIII and IX.

An application of this device, with reference to FIGURE VII, for example, is as a chromatographic sampling device wherein the main input flows are on the one hand a carrier gas and on the other hand a sample gas. In any one situation, either the carrier gas or the sample gas is emerging from the common output 22 by itself and upon the application of a control signal, from one side or the other, the common output gas is moved over and the other gas is moved in. Thus, a carrier gas may be sheared off at merging point 23 by a sample gas on a finite volume basis and at the right moment on a program basis, the carrier gas may be switched back in to shear off the sample gas so that from the common output there emerges a flow of carrier gas with a finite unit of sample gas in it.

The structures of FIGURES VIII and IX can similarly be used for the gas sampling purposes and variants in the control chamber 34 may be achieved according to the desired relationships between the gases in the course of the sampling switching operation.

This invention, therefore, provides a new and novel fluid switching device.

As many embodiments may be made in the above, and as changes may be made in the embodiments set forth above without departing from the scope of the invention, it is to be understood that all matter hereinbefore set forth or shown in the accompanying drawings is to be interpreted as illustrative only and not in a limiting sense.

I claim:

1. A fluid logic device comprising two main flow inputs, two main flow outputs each specific to and capable of receiving fluid from only one of said inputs, a third output, common to both of said main flow inputs, one at a time only, and control input means in addition to said main flow inputs for transverse application of control fluid, simultaneously to both and on the same side, to fluid from said inputs, to selectively apply said fluid from said inputs to said outputs whereby only one of said main flow inputs is established in said common output at any one time, and whereby either input can be directed only to its specific output or to said common output.

2. A fluid logic device comprising two units each having an independent input, two outputs, one of which is specific to one unit only, a transverse control input on each side of each of said units, a merger of two of said outputs, one from each of said units, forming dividing means between said units and leading to a single common output from said device, means for connecting said control inputs in pairs including one to each of said units, whereby a single control signal operates both of said units one way and another single control signal operates both of said units the other way, with the input of each unit thus controllable to be established only in its specific output or in the common output, because of said dividing means, and in said common output only while the other of said unit inputs is established in the output specific to that unit.

References Cited by the Examiner

UNITED STATES PATENTS

| | | | |
|---|---|---|---|
| 3,075,548 | 1/1963 | Horton | 137—81.5 X |
| 3,080,886 | 3/1963 | Severson | 137—81.5 |
| 3,107,850 | 10/1963 | Warren et al. | 137—81.5 X |
| 3,117,593 | 1/1964 | Sowers | 137—81.5 |
| 3,171,421 | 3/1965 | Joesting | 137—81.5 |

M. CARY NELSON, *Primary Examiner.*

S. SCOTT, *Assistant Examiner.*